US009246522B1

United States Patent
Wong et al.

(10) Patent No.: US 9,246,522 B1
(45) Date of Patent: Jan. 26, 2016

(54) APPARATUS AND METHOD FOR SELECTING ANTENNA PATHS FOR MULTIPLE WIRELESS COMMUNICATION COMPONENTS

(71) Applicant: Marvell International Ltd., Hamilton (BM)

(72) Inventors: Gladys Yuen Yan Wong, Fremont, CA (US); George Lee, San Jose, CA (US)

(73) Assignee: MARVELL INTERNATIONAL LTD., Hamilton (BM)

( * ) Notice: Subject to any disclaimer, the term of this patent is extended or adjusted under 35 U.S.C. 154(b) by 0 days.

(21) Appl. No.: 14/563,700

(22) Filed: Dec. 8, 2014

Related U.S. Application Data

(63) Continuation of application No. 12/204,706, filed on Sep. 4, 2008, now Pat. No. 8,908,667.

(60) Provisional application No. 60/970,637, filed on Sep. 7, 2007, provisional application No. 61/025,125, filed on Jan. 31, 2008.

(51) Int. Cl.
*H04W 4/00* (2009.01)
*H04B 1/04* (2006.01)
*H04W 84/12* (2009.01)

(52) U.S. Cl.
CPC . *H04B 1/04* (2013.01); *H04W 84/12* (2013.01)

(58) Field of Classification Search
CPC ...... H04W 84/12; H04W 84/18; H04W 80/04
See application file for complete search history.

(56) References Cited

U.S. PATENT DOCUMENTS

| 6,381,228 | B1 | 4/2002 | Prieto, Jr. et al. |
| 6,574,461 | B1 | 6/2003 | Skold |
| 7,599,332 | B2 | 10/2009 | Zelst et al. |
| 7,742,390 | B2 | 6/2010 | Mujtaba |
| 7,907,585 | B2 | 3/2011 | Sanders |

(Continued)

OTHER PUBLICATIONS

IEEE Std 802.11-2007 (revision of IEEE Std. 802.11-1999) "Information Standard for Information technology—Telecommunications and information exchange between systems—Local and metropolitan area networks—Specific requirements" Part 11: Wireless LAN Medium Access Control (MAC) and Physical Layer (PHY) Specifications, *The Institute of Electrical and Electronics Engineers, Inc.*, pp. 1-1184 (Jun. 12, 2007).

(Continued)

*Primary Examiner* — Hassan Kizou
*Assistant Examiner* — Abdelnabi Musa

(57) ABSTRACT

An arbiter circuit receives a plurality of media access request signals from multiple protocol processing devices, and generates a plurality of media access grant indicators using i) the plurality of media access request signals, and ii) coexistence arbitration rules. A selector circuit receives the plurality of media access grant indicators from the arbiter circuit, and when the plurality of media access grant indicators indicate more than one protocol processing device is authorized to access an antenna, determines a compatibility of the more than one protocol processing device simultaneously accessing the antenna. The selector circuit, based on i) the plurality of media access grant indicators, and ii) the determined compatibility of the more than one protocol processing device simultaneously accessing the antenna, controls one or more switches to selectively enable antenna paths in a plurality of antenna paths coupled to the antenna.

32 Claims, 12 Drawing Sheets

(56) References Cited

U.S. PATENT DOCUMENTS

| | | | |
|---|---|---|---|
| 8,619,907 B2 | 12/2013 | Mujtaba et al. | |
| 8,908,667 B1 | 12/2014 | Wong et al. | |
| 2004/0048577 A1* | 3/2004 | Godfrey | H04L 1/1867 455/67.11 |
| 2005/0271010 A1 | 12/2005 | Capretta | |
| 2006/0030265 A1* | 2/2006 | Desai | H04W 72/1215 455/41.2 |
| 2006/0246932 A1* | 11/2006 | Liang | H04W 72/1215 455/515 |
| 2007/0207752 A1* | 9/2007 | Behzad | H04B 1/406 455/132 |
| 2008/0253345 A1 | 10/2008 | Sanguinetti | |
| 2008/0260002 A1 | 10/2008 | Zhang et al. | |
| 2009/0264086 A1* | 10/2009 | Song | H04B 1/006 455/90.2 |
| 2010/0284380 A1* | 11/2010 | Banerjee | H04W 16/14 370/338 |
| 2013/0163460 A1 | 6/2013 | Gonikberg et al. | |

OTHER PUBLICATIONS

IEEE P802.11n™/D3.00, "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Higher Throughput," *The Institute of Electrical and Electronics Engineers, Inc.*, pp. 1-544 (Sep. 2007).

Chen, "Home Network Basis: Transmission Environments and Wired/Wireless Protocols," *Prentice Hall*, pp. 1-26 (Jul. 2003).

Harada, "Project: IEEE P802.15 Working Group for Wireless Personal Area Network (WPANs)," IEEE 802.15-07-0693-003c, slides 24-33 (May 2007).

Hiertz, et al., "The IEEE 802.11 Universe," *IEEE Communications Magazine*, pp. 62-70, (Jan. 2010).

Mujtaba, S.A. "IEEE P802.11—Wireless LANs, TGn Sync Proposal Technical Specification," *The Institute of Electrical and Electronics Engineers, Inc.*, doc.: IEEE 802.11-04/0889r6, pp. 1-131 (May 2005).

Specification of the Bluetooth System, Version 2.0: vol. 0, "Master Table of Contents & Compliance Requirements," pp. 1-74; vol. 1, "Architecture & Terminology Overview," pp. 1-92; vol. 2, "Core System Package [Controller Volume]", pp. 1-814; vol. 4, "Core System Package [Host Volume]," pp. 1-250, (Nov. 4, 2004).

van Nee, et al. "The 802.11n MIMO-OFDM Standard for Wireless LAN and Beyond," Wireless Personal Communications, vol. 37, pp. 445-453 (Jun. 2006).

* cited by examiner (Background)

APPARATUS AND METHOD FOR SELECTING ANTENNA PATHS FOR MULTIPLE WIRELESS COMMUNICATION COMPONENTS

CROSS-REFERENCES TO RELATED APPLICATIONS

This application is a continuation of U.S. application Ser. No. 12/204,706, filed Sep. 4, 2008, which claims the benefit of U.S. Provisional Application No. 60/970,637, filed Sep. 7, 2007, and U.S. Provisional Application No. 61/025,125, filed on Jan. 31, 2008. All of the applications referenced above are hereby incorporated by reference herein in their entireties.

FIELD OF THE DISCLOSURE

The present disclosure generally relates to the field of wireless communication, and more specifically to selecting antenna paths between an antenna and multiple wireless communication protocol components (e.g., components configured to process radio frequency (RF) input and/or RF output signals according to one or more wireless communication protocols).

BACKGROUND

Unlicensed radio spectrum such as the industrial, scientific, and medical (ISM) radio bands are used for an increasing number of wireless applications using a variety of standards and protocols. Often, a single device is desired to operate using two or more of these standards and/or protocols in the same radio band. For example, in the 2.4 GHz ISM band a device may access a wireless personal area network (WPAN) using a protocol such as Bluetooth as well as a wireless local area network (WLAN) using a protocol such as one of the IEEE 802.11 or "Wi-Fi" protocols.

WPAN protocols such as Bluetooth are generally designed for cable-replacement applications such as wireless headsets, wireless synchronization of personal digital assistants (PDAs) with computers, wireless peripherals such as printers or keyboards, etc. Most Bluetooth implementations support a range of up to approximately 10 m and speeds of up to 700 Kb/sec for data or isochronous voice transmission. Bluetooth can typically support "piconets" of up to eight active devices, with a maximum of three synchronous-connection-oriented (SCO) links. SCO links are designed to support real-time, isochronous applications such as cordless telephony or headsets. Bluetooth also supports asynchronous connection links (ACLs) that are used to exchange data in non-time-critical applications. The Bluetooth physical (PHY) layer uses frequency-hopping spread spectrum (FHSS) at a rate of 1600 hops/sec and Gaussian frequency shift keying (GFSK) modulation. Bluetooth devices typically transmit at a power level of about 1 mW with a raw data rate of approximately 1 Mb/sec.

WLAN protocols include the IEEE 802.11 and/or Wi-Fi family of standards for wireless networking between computers and/or other devices. WLAN protocols generally provide for longer distances (100 m or more) and higher data rates (e.g., 11 Mb/sec, 54 Mb/sec, or more) than WPAN protocols. WLANS are commonly used for internet access, e-mail, file sharing, etc. Like Ethernet, Wi-Fi supports true multipoint networking with such data types as broadcast, multicast, and unicast packets. The MAC address built into every device allows a virtually unlimited number of devices to be active in a given network. These devices contend for access to the airwaves using a scheme called carrier sense multiple access with collision avoidance (CSMA/CA). The Wi-Fi physical layer uses direct-sequence spread spectrum (DSSS) at four different data rates using a combination of differential binary phase-shift keying (DBPSK) for 1 Mb/sec, differential quaternary phase-shift keying (DQPSK) for 2 Mb/sec, and QPSK/complementary code keying (CCK) for 5.5 and 11 Mb/sec. The RF power level can vary, but is typically between 30 and 100 mW in typical WLAN devices.

WPAN and WLAN are generally complementary rather than competing technologies. In particular, coexistence of Bluetooth and Wi-Fi devices is increasingly desired. Because both technologies occupy the 2.4 GHz frequency band, there is potential for interference between the two technologies. The coexistence of two wireless applications such as Bluetooth and Wi-Fi in the same radio band, but with different channel access protocols, requires particular attention to simultaneous operation of both systems in very close proximity.

If Bluetooth and Wi-Fi operate at the same time in the same place, they will interfere (collide) with each other. Specifically, these systems transmit on overlapping frequencies, creating in-band colored noise for one another. The sidebands of each transmission must also be accounted for. Interference between Bluetooth and Wi-Fi may occur, for example, when a Wi-Fi receiver senses a Bluetooth signal at the same time a Wi-Fi signal is being sent to the Wi-Fi receiver or when a Bluetooth receiver senses a Wi-Fi signal at the same time a Bluetooth signal is being sent to the Bluetooth receiver.

One solution is to use a Bluetooth coexistence architecture (BCA) as a media access control (MAC) layer to perform synchronization between the different protocols, and ensure that bandwidth over the shared spectrum is allocated in a non-concurrent yet fair basis. Such a solution would eliminate any potential conflict and still maintain inherent link performance attributes. FIG. 1 shows an example wireless device 100 with WLAN component 101 and Bluetooth component 102. WLAN component 101 and Bluetooth component 102 generally send media access requests to media access controller 103, which applies arbitration rules to determine whether to allow a media access grant and to provide the protocol components 101 and 102 with access to the antenna system for receiving and/or transmitting.

With the introduction of single-antenna coexistence solutions, front-end designs have become more complicated and require more control signals for antenna path selection. For example, there may be switches to select between WLAN transmit, WLAN receive, and Bluetooth transmit. Since front-end designs may vary widely, fixed-polarity control signals from a media access controller may be difficult or costly to implement for each front-end.

SUMMARY

In an embodiment, an apparatus is for use in a system having i) a plurality of antenna paths configured to couple multiple protocol processing devices to an antenna, and ii) one or more switches to selectively enable antenna paths in the plurality of antenna paths. The apparatus comprises an arbiter circuit configured to receive a plurality of media access request signals from the multiple protocol processing devices, wherein each protocol processing device is configured to operate in conformance with a respective communication protocol, and generate a plurality of media access grant indicators using i) the plurality of media access request signals, and ii) coexistence arbitration rules, wherein the plurality of media access grant indicators indicate, for each protocol processing device, whether the protocol processing device is authorized to access the antenna. The apparatus also comprises a selector circuit configured to receive the plurality of media access grant indicators from the arbiter circuit, when the plurality of media access grant indicators indicate more than one protocol processing device is authorized to access the antenna, determine a compatibility of the more than one protocol processing device simultaneously accessing the antenna, and generate a plurality of switch control signals based on i) the plurality of media access grant indicators, and ii) the determined compatibility of the more than one protocol processing device simultaneously accessing the antenna, the plurality of switch control signals for controlling the one or more switches to selectively enable antenna paths in the plurality of antenna paths, including selectively enabling a shared antenna path that permits shared access to the antenna by two or more of the protocol processing devices.

In another embodiment, a method is for use in a system having i) a plurality of antenna paths configured to couple multiple protocol processing devices to an antenna, and ii) one or more switches to selectively enable antenna paths in the plurality of antenna paths. The method includes receiving, at one or more integrated circuit (IC) devices, a plurality of media access request signals from the multiple protocol processing devices, wherein each protocol processing device is configured to operate in conformance with a respective communication protocol; generating, at one or more IC devices, a plurality of media access grant indicators using i) the plurality of media access request signals, and ii) coexistence arbitration rules, wherein the plurality of media access grant indicators indicate, for each protocol processing device, whether the protocol processing device is authorized to access the antenna; when the plurality of media access grant indicators indicate more than one protocol processing device is authorized to access the antenna, determining, at one or more IC devices, a compatibility of the more than one protocol processing device simultaneously accessing the antenna; and generating, at one or more IC devices, a plurality of switch control signals based on i) the plurality of media access grant indicators, and ii) the determined compatibility of the more than one protocol processing device simultaneously accessing the antenna, the plurality of switch control signals for controlling the one or more switches to selectively enable antenna paths in the plurality of antenna paths, including selectively enabling a shared antenna path that permits shared access to the antenna by two or more of the protocol processing devices.

In yet another embodiment, a tangible, non-transitory computer readable medium stores machine readable instructions that, when executed by a processor in a system having i) a plurality of antenna paths configured to couple multiple protocol processing devices to an antenna, and ii) one or more switches to selectively enable antenna paths in the plurality of antenna paths, cause the processor to: generate a plurality of media access grant indicators using i) a plurality of media access request signals corresponding to multiple protocol processing devices, and ii) coexistence arbitration rules, wherein each protocol processing device is configured to operate in conformance with a respective communication protocol, and the plurality of media access grant indicators indicate, for each protocol processing device, whether the protocol processing device is authorized to access the antenna; when the plurality of media access grant indicators indicate more than one protocol processing device is authorized to access the antenna, determine a compatibility of the more than one protocol processing device simultaneously accessing the antenna; and cause a plurality of switch control signals to be generated based on i) the plurality of media access grant indicators, and ii) the determined compatibility of the more than one protocol processing device simultaneously accessing the antenna, the plurality of switch control signals for controlling the one or more switches to selectively enable antenna paths in the plurality of antenna paths, including selectively enabling a shared antenna path that permits shared access to the antenna by two or more of the protocol processing devices.

DETAILED DESCRIPTION

Figure 1:
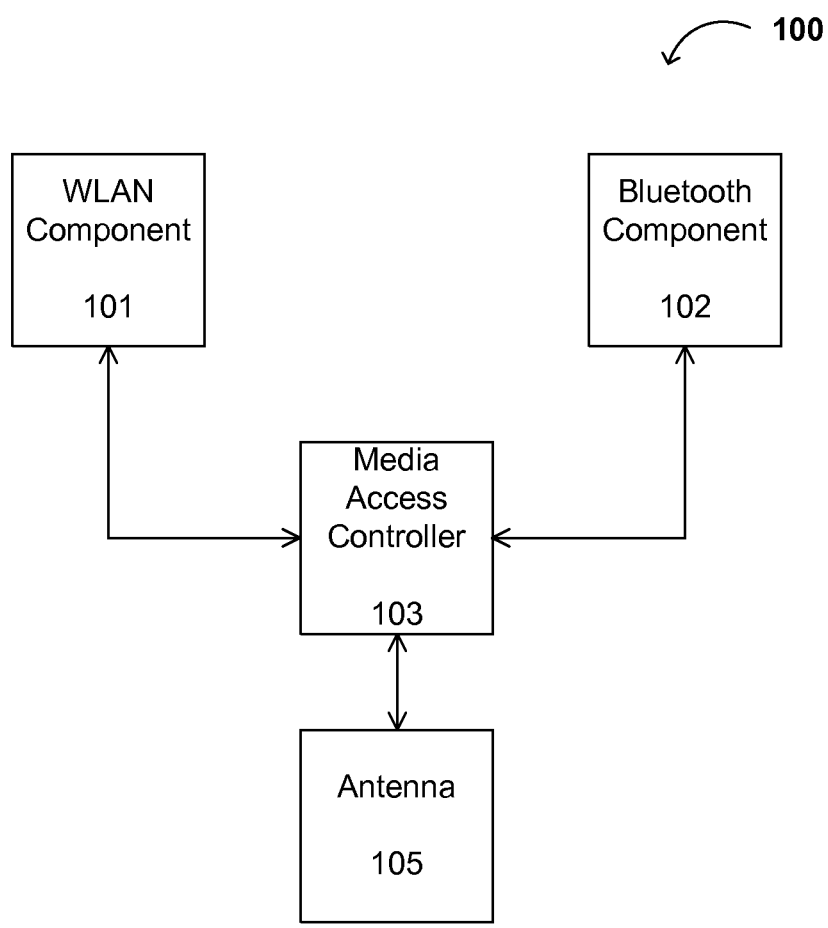
FIG. 1 is a diagram showing a multi-protocol wireless communication device.

Reference will now be made in detail to embodiments of the invention, examples of which are illustrated in the accompanying drawings. While the invention will be described in conjunction with the embodiments, it will be understood that they are not intended to limit the invention to these embodiments. On the contrary, the invention is intended to cover alternatives, modifications and equivalents that may be included within the scope of the invention as defined by the appended claims. Furthermore, in the following detailed description of the embodiments of the present invention, numerous specific details are set forth in order to provide a thorough understanding of the embodiments of the present invention. However, the embodiments of the present invention may be practiced without these specific details. In other instances, well-known methods, procedures, components, and circuits have not been described in detail so as not to unnecessarily obscure aspects of the embodiments of the present invention.

Some portions of the detailed descriptions which follow are presented in terms of processes, procedures, logic blocks, functional blocks, processing, and other symbolic representations of operations on data bits, data streams or waveforms within a computer, processor, controller and/or memory. These descriptions and representations are generally used by those skilled in the data processing arts to effectively convey the substance of their work to others skilled in the art. A process, procedure, logic block, function, operation, etc., is herein, and is generally, considered to be a self-consistent sequence of steps or instructions leading to a desired and/or expected result. The steps generally include physical manipulations of physical quantities. Usually, though not necessarily, these quantities take the form of electrical, magnetic, optical, or quantum signals capable of being stored, transferred, combined, compared, and otherwise manipulated in a computer, data processing system, or logic circuit. It has proven convenient at times, principally for reasons of common usage, to refer to these signals as bits, waves, waveforms, streams, values, elements, symbols, characters, terms, numbers, or the like.

It should be borne in mind, however, that all of these and similar terms are associated with the appropriate physical quantities and are merely convenient labels applied to these quantities. Unless specifically stated otherwise and/or as is apparent from the following discussions, it is appreciated that throughout the present application, discussions utilizing terms such as "processing," "operating," "computing," "calculating," "determining," "manipulating," "transforming," "displaying" or the like, refer to the action and processes of a computer, data processing system, logic circuit or similar processing device (e.g., an electrical, optical, or quantum computing or processing device), that manipulates and transforms data represented as physical (e.g., electronic) quantities. The terms refer to actions, operations and/or processes of the processing devices that manipulate or transform physical quantities within the component(s) of a system or architecture (e.g., registers, memories, other such information storage, transmission or display devices, etc.) into other data similarly represented as physical quantities within other components of the same or a different system or architecture.

Furthermore, for the sake of convenience and simplicity, the terms "clock," "time," "rate," "period" and "frequency" are generally used interchangeably herein, but are generally given their art-recognized meanings. Also, for convenience and simplicity, the terms "data," "data stream," "waveform" and "information" may be used interchangeably, as may the terms "connected to," "coupled with," "coupled to," and "in communication with" (which terms also refer to direct and/or indirect relationships between the connected, coupled and/or communication elements unless the context of the term's use unambiguously indicates otherwise), but these terms are also generally given their art-recognized meanings.

The invention, in its various aspects, will be explained in greater detail below with regard to example embodiments.

An Example Coexistence Architecture

Figure 2:
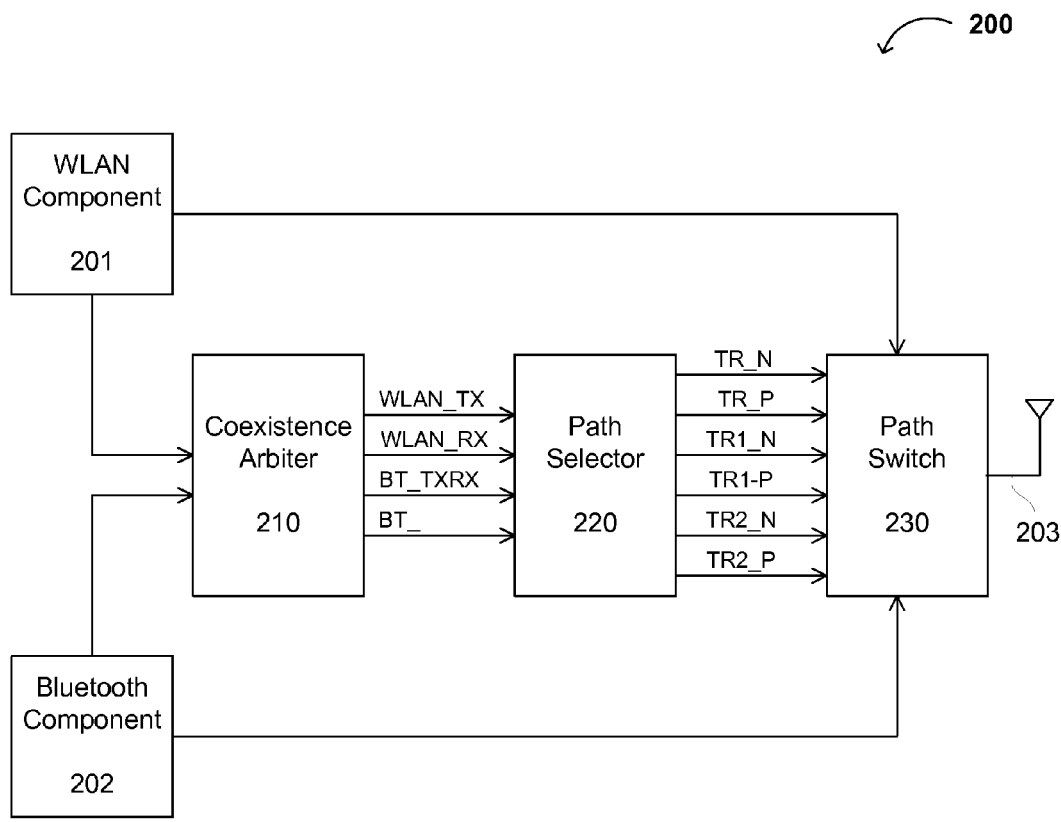
FIG. 2 is a diagram showing an example embodiment of a multi-protocol coexistence arbitration architecture.

FIG. 2 shows an example coexistence architecture 200 for selecting one or more antenna paths 231 and/or 232 between an antenna 203 and multiple wireless communication protocol components 201, 202 (e.g., components configured to process radio frequency (RF) input and/or RF output signals according to one or more of wireless communication protocols). In one embodiment, antenna paths 231, 232 are respectively direct paths from path switch 230 to the wireless communication protocol components 201, 202—e.g., there are no intermediate switches (or other components) located between path switch 230 and the wireless communication protocol components 201, 202. In other embodiments, antenna paths 231 and/or 232 can include one or more switches and or other components (e.g., a power amplifier). Coexistence arbiter 210 receives grant requests 211 from protocol component 201 and grant requests 212 from protocol component 202. Coexistence arbiter 210 then applies media access arbitration rules to determine which component or components should receive media access, and provides one or more media grant signals to path selector 220.

Path selector 220 processes the media grant requests to produce antenna path selection outputs to path switch 230 based on the grant requests. Path selector 220 may be configured to produce the antenna path selection outputs based on a predetermined compatibility of media access grants corresponding to the grant inputs. In some embodiments, path selector 220 may be configured to calculate the compatibility and/or to look up path selections from a table in a memory. In addition, path selector 220 may be configured to delay transitions in one or more of the antenna path selection outputs based on a pre-determined switch response time. The delay time may be configured in hardware (e.g., in pre-determined delay buffers), in software, and/or in firmware (e.g., in a table in memory).

Wireless network modules may include, for example, personal area network (e.g., Bluetooth) modules, wireless local area network (e.g., IEEE 802.11a/b/g/n) modules, wireless wide area network (e.g., Wi-Max, GPRS, EDGE, EV-DO, etc.) modules, etc. Example protocol component 201 may comprise a WLAN component and example protocol component 202 may comprise a Bluetooth component, however multiple protocol components for a variety of wireless networking or other wireless communication protocols may be adapted according to the embodiments presented herein. Coexistence architecture 200 is particularly advantageous for arbitrating media access requests when protocol components 201, 202 operate in the same RF bands and/or in RF bands that potentially interfere with each other.

Coexistence arbiter 210 receives grant requests 211, 212 and may apply WLAN and Bluetooth coexistence arbitration rules (e.g., based on the priority, protocol-specified latency, or other attributes of packets to be transmitted or received) to produce the media access grant indicators. For example, WLAN_TX may indicate that WLAN transmission is authorized and WLAN_RX may indicate that WLAN reception is authorized. Coexistence arbiter 210 may produce a single BT_TXRX signal to indicate that a bi-directional Bluetooth path is authorized. In some embodiments, coexistence arbiter 210 may also produce a BT_TX indicator to indicate that a transmit-only path is authorized. In such embodiments, a combination of BT_TXRX and BT_TX (e.g., where BT_TXRX is asserted but BT_TX is not asserted) may indicate a receive-only Bluetooth path.

Path selector 220 generally processes the grant indicator signals to produce path selection signals suitable for enabling and/or disabling antenna paths 231 and/or 232 (e.g., for controlling path switches in the analog domain). The output signals generally include a plurality of complementary signal pairs. For example, TR_N and TR_P, TR1_N and TR1_P, TR2_N and TR2_P, may each comprise complementary signal pairs for enabling and/or disabling one or more switch components (not shown) in path switch 230. Thus, in example coexistence architecture 200 path selector 220 may produce a three bit path selection value. In general, the number of signal pairs and/or bits of the output selection may depend more on the switching component requirements (e.g., as shown below with respect to example switch configurations in FIGS. 4A to 5C) than on the number of path combinations.

Path selector 220 may be configured to produce a Bluetooth transmit path selection for enabling a first transmit path from Bluetooth component 202 to antenna 203, a WLAN transmit path selection for enabling a transmit path from WLAN component 201 to antenna 203, and/or a shared receive path selection for enabling receive paths from antenna 203 to both Bluetooth component 202 and WLAN component 201. In a still further embodiment, the selector circuit may be configured to produce the shared receive path selection when the Bluetooth grant input and the WLAN receive grant input are positive and a Bluetooth transmit grant input is negative.

Figure 3:
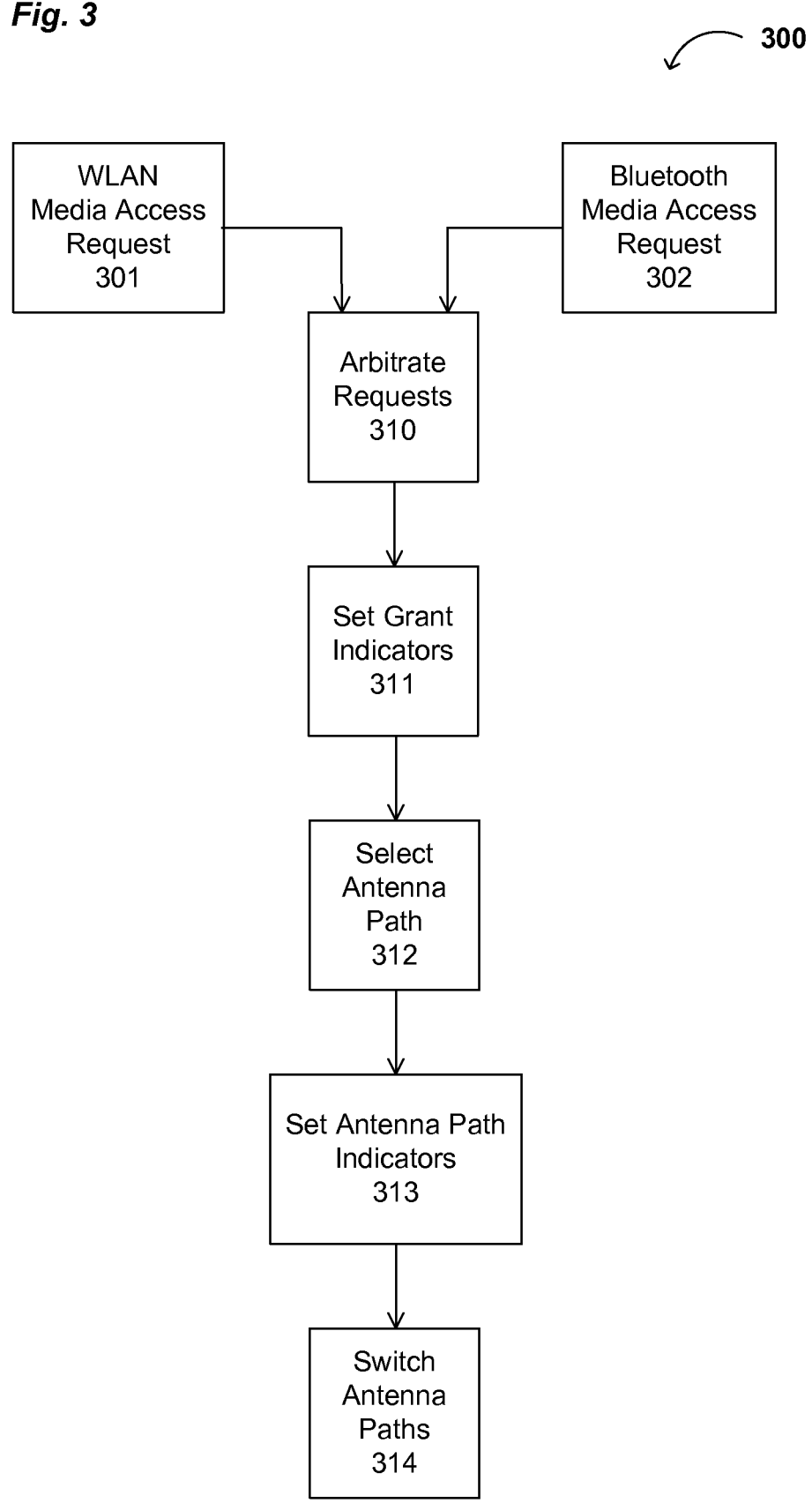
FIG. 3 is a diagram showing an example embodiment of a method for arbitrating media access requests from multiple wireless protocol components.

FIG. 3 shows an example method 300 for selecting antenna paths between an antenna and a plurality of protocol components. At steps 301 and 302, one or more of the protocol components (e.g., WLAN and/or Bluetooth components) provides a grant request for media access. At step 310, a coexistence arbiter receives the grant requests and applies media access arbitration rules to determine which protocol component or components should receive media access. At step 311, grant indicators are set to indicate one or more logical grant states (e.g., to grant transmit and/or receive access to one or more protocol components).

At step 312, the grant indicators are received (e.g., as input signals, values read from registers and/or other memory, etc.), and processed to produce select one or more appropriate antenna paths based on the logical grant values. Step 312 may, for example comprise looking up a set of path selection values corresponding to the input grant indicators (e.g., by looking up data corresponding to such compatibility in a table or other data structure). Thus, the path selection values may be predetermined values adapted for a particular path switch hardware implementation. At step 313, antenna path indicators are set to configure the path switch hardware (e.g., to configure the analog path(s) between the antenna and one or more of the protocol components). Depending on the capabilities of the path switch hardware, the method may include producing a shared selection for simultaneously enabling transmit and/or receive paths from the antenna to two or more of the protocol components. At step 314, the antenna paths are switched based on the path indicators.

Example Path Selections

Figure 4A:
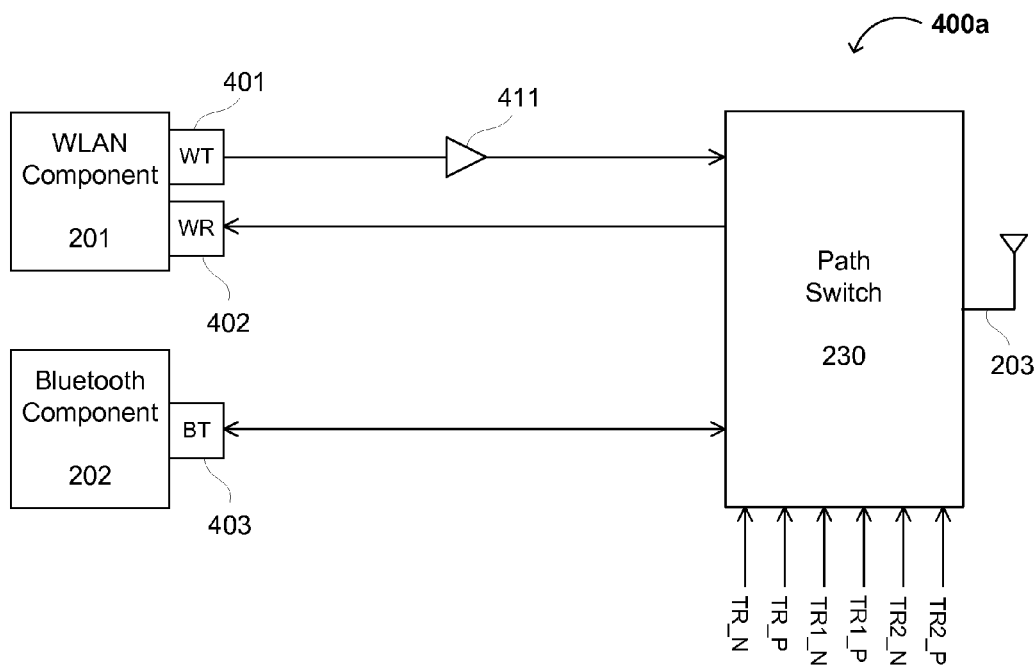
FIGS. 4A-4C are diagrams of example media access path switches.
Figure 4B:
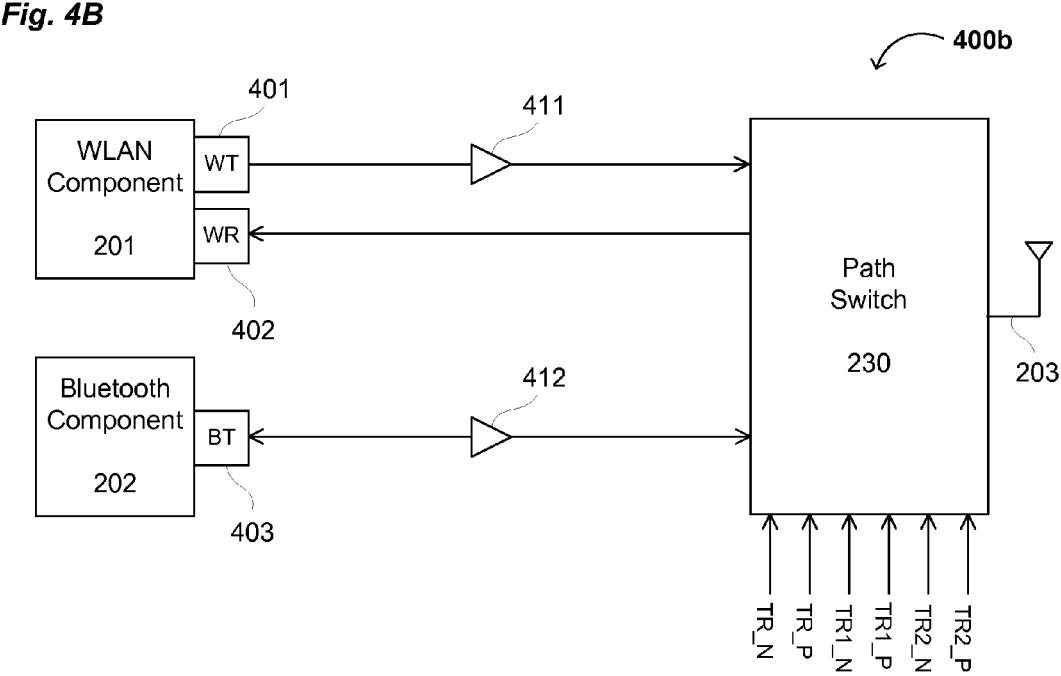
Figure 4C:
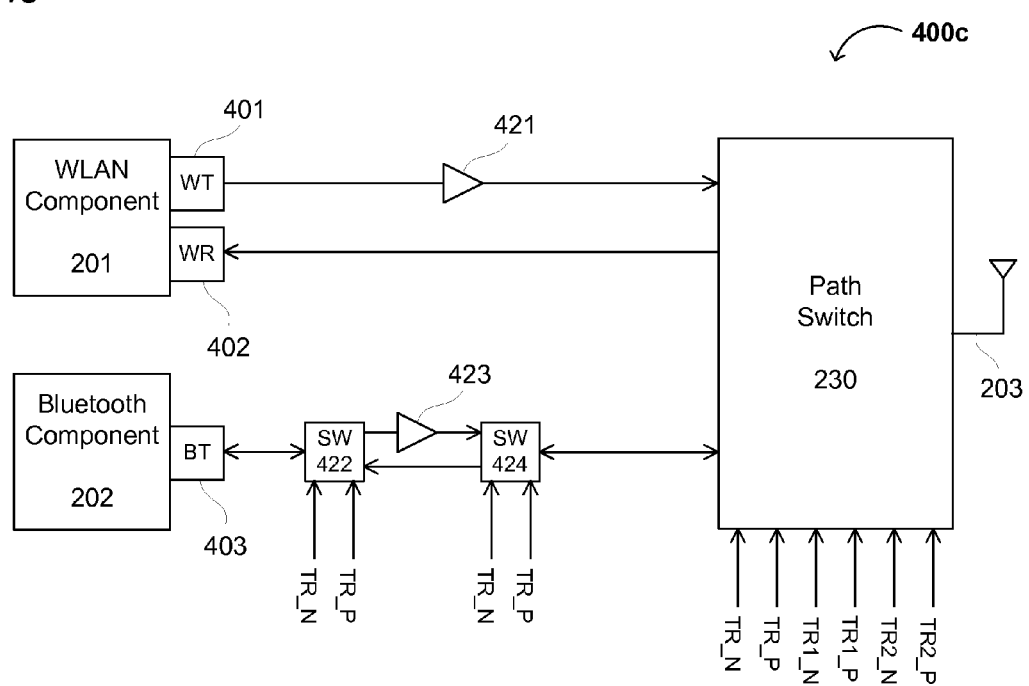

FIGS. 4A-4C show example path architectures between an antenna and multiple protocol components, where no paths are shared between WLAN component 201 and Bluetooth component 202. WLAN component 201 generally has WLAN transmit port 401 and WLAN receive port 402. Bluetooth component 202 generally has Bluetooth transmit/receive port 403. Path switch 230 generally switches between the signal paths in response to one or more complementary path switch indicator pairs (e.g., TR_N and TR_P, TR1_N and TR1_P, etc.). FIG. 4A shows an example path architecture 400a where path switch 230 selects between paths 451, 452, and 453 in response to the path select signals. For example, path 451 may be enabled by TR_P and disabled by TR_N, path 452 may be enabled by TR1_P and disabled by TR1_N, etc. Thus, the path selector (e.g., path selector 220 of FIG. 2) may be configured to produce those signals corresponding to the desired paths to enable. Path 400a may include an amplifier 411 on WLAN transmit path 451.

FIG. 4B shows another example path architecture 400b which also includes an amplifier on Bluetooth transmit/receive path 453. FIG. 4C shows an improved path architecture 400c. Path selection signals may be provided to switches 422 and 424 so that amplifier 412 only amplifies path 453 while the Bluetooth component 202 is transmitting, thus improving the functionality of Bluetooth transmit receive-path 453.

Figure 5A:
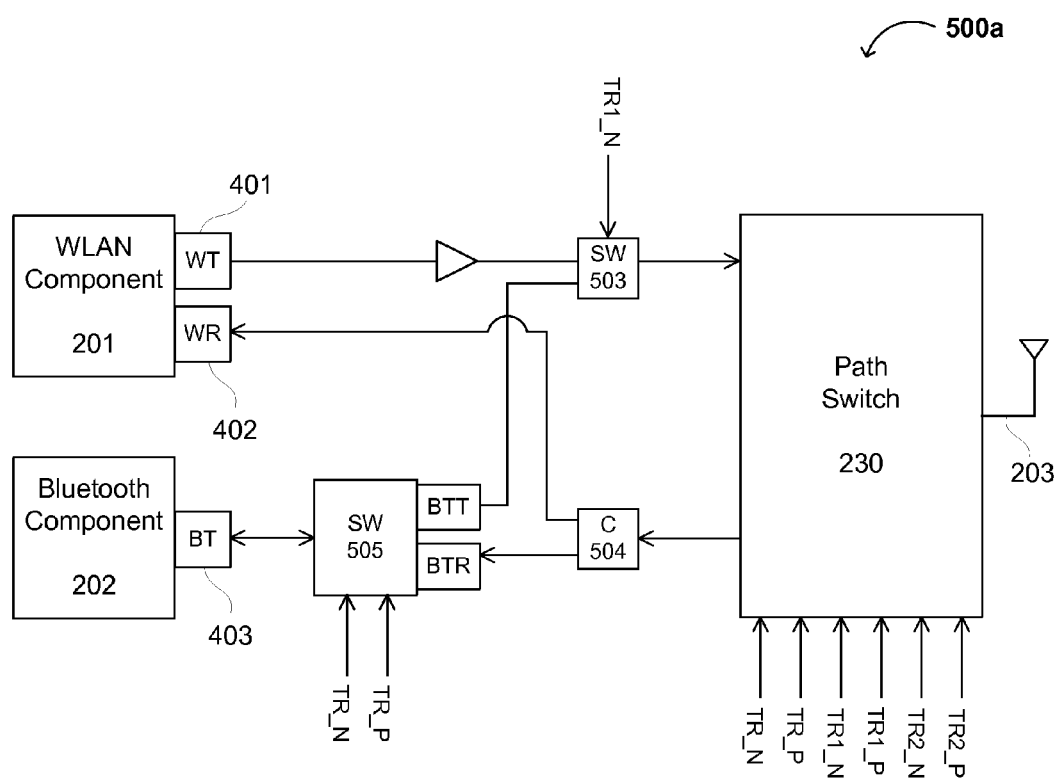
FIGS. 5A-5C are diagrams of further example media access path switches.
Figure 5B:
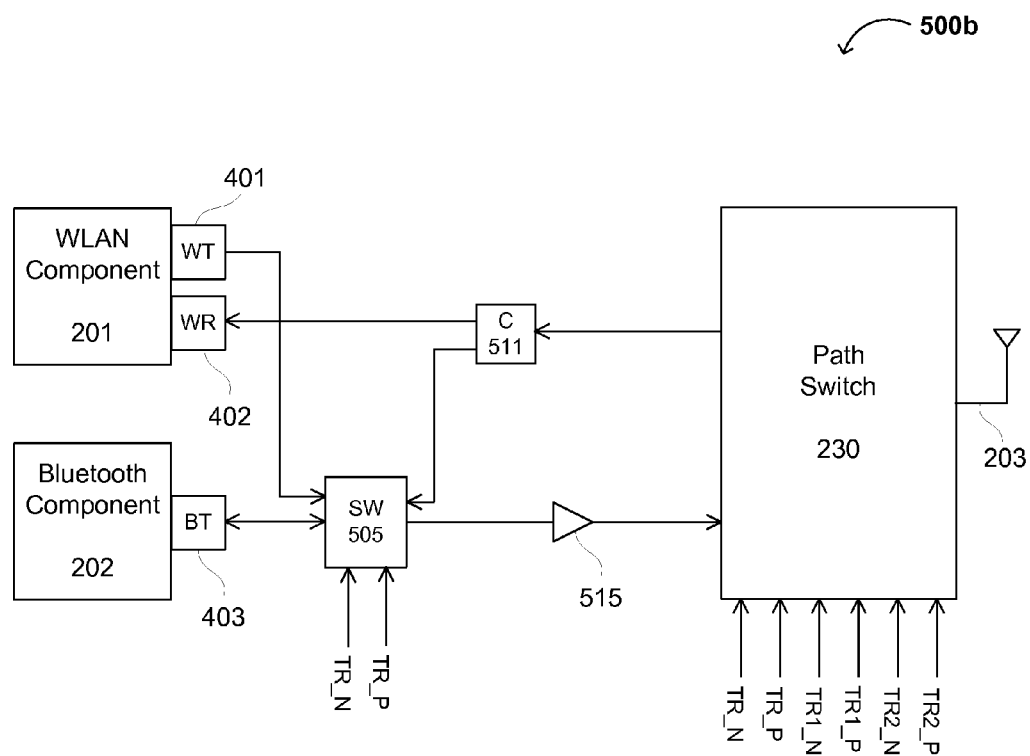
Figure 5C:
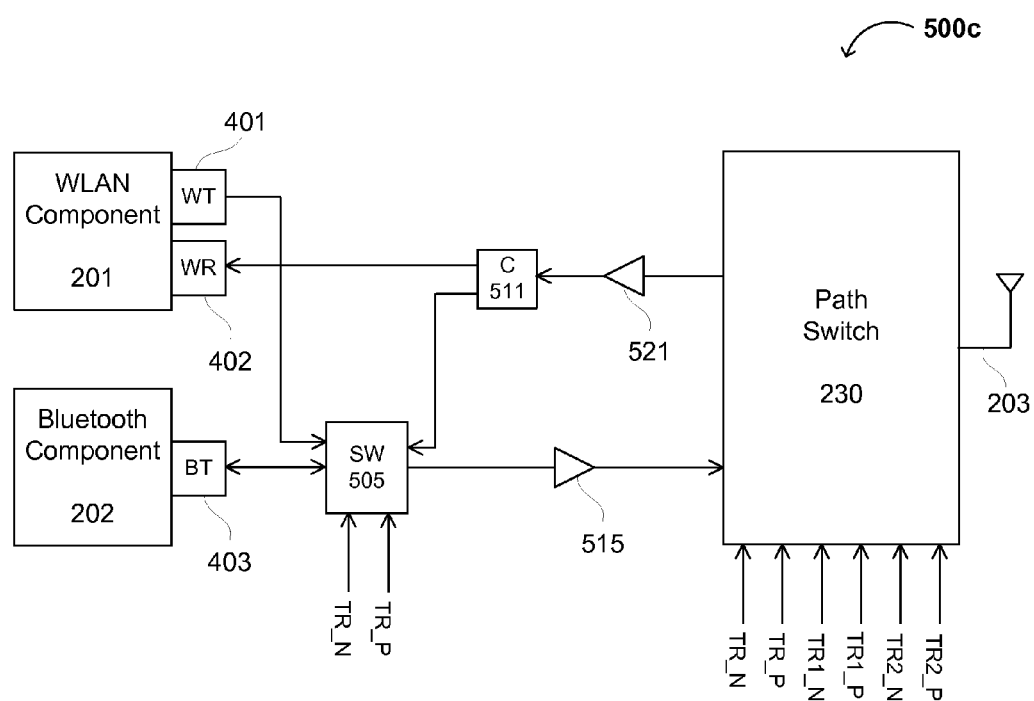

FIGS. 5A-5C show additional example path architectures. In FIG. 5A, path architecture 500a may provide for a receive path shared between WLAN component 201 and Bluetooth component 202. Bluetooth transmit/receive port 403 is coupled to switch 505, which switches between a Bluetooth transmit path and a Bluetooth receive path based on a path selection indicator. The Bluetooth transmit port (BTT) and the WLAN transmit port 401 are coupled to another switch 503 configured to switch between the two transmit paths based on another path selection indicator. Coupler 504 couples a shared receive path to the Bluetooth receive port of switch 505 and to WLAN receive port 402.

FIG. 5B shows another example path architecture 500b wherein the WLAN receive path and the Bluetooth transmit/receive path may be active simultaneously and where the Bluetooth and WLAN transmit paths may share an amplifier 515. Coupler 511 generally couples the shared paths to WLAN receive port 402 and to Bluetooth transmit/receive port 403. FIG. 5C shows another example path architecture 500c where the WLAN receive path and the Bluetooth receive path may be active simultaneously. Coupler 511 generally couples the shared receive path to WLAN receive port 402 and to Bluetooth switch 505. Switch 505 may thus be configured to enable the Bluetooth receive path, the WLAN transmit path, and/or the Bluetooth transmit path in response to one or more path selection indicators. Bluetooth and WLAN receive paths may, for example, share an amplifier 522.

Each of the path architectures 400a-c and 500a-c may also include additional protocol components and/or additional signal paths. For example, WLAN component 201 may implement one or more WLAN protocols using two or more radio frequency bands (e.g., the 2.4 GHz band and the 5 GHz band). Thus, each protocol component may have signal paths for each band. The signal paths for each band may use the same switching interface and/or radio frequency front end or may use separate switching interfaces and/or radio frequency front ends for each radio frequency band. Thus, WLAN component 201 may use a radio frequency front end including path switch 230 to access one radio frequency band (e.g., the 2.4 GHz band which may interfere with Bluetooth communications) through signal paths 451 and 452, while also using additional signal paths (not shown) to access the 5 GHz band either through path switch 230 or through a different radio frequency front end.

Advantageously, when a path selection module (e.g., path selector 230 of FIG. 2) is used, each of the path architectures 400a-c and 500a-c may be implemented without changes to either the wireless protocol components or to the media access arbiter.

Example Software

Embodiments of the present invention also includes algorithms, computer program(s) and/or software, implementable and/or executable in a general purpose computer or workstation equipped with a conventional digital signal processor, configured to perform one or more steps of the method and/or one or more operations of the hardware. Thus, a further aspect of the invention relates to algorithms and/or software that implement the above method(s). For example, embodiments of the invention may further relate to a computer program, computer-readable medium, or waveform containing a set of instructions which, when executed by an appropriate processing device (e.g., a signal processing device, such as a microcontroller, microprocessor or DSP device), is configured to perform the above-described method and/or algorithm.

For example, the computer program may be on any kind of readable medium, and the computer-readable medium may comprise any medium that can be read by a processing device configured to read the medium and execute code stored thereon or therein, such as a floppy disk, CD-ROM, magnetic tape or hard disk drive. Such code may comprise object code, source code and/or binary code.

Example waveforms are generally configured for transmission through an appropriate medium, such as copper wire, a conventional twisted pair wireline, a conventional network cable, a conventional optical data transmission cable, or even air or a vacuum (e.g., outer space) for wireless signal transmissions.

The waveforms and/or code for implementing the present method(s) are generally digital, and are generally configured for processing by a conventional digital data processor (e.g., a microprocessor, microcontroller, or logic circuit such as a programmable gate array, programmable logic circuit/device or application-specific [integrated] circuit). The codes and/or instructions may directly implement the operations described here. Alternatively, one or more of the codes or instructions may be adapted to configure a device (e.g., a programmable circuit device) to form the circuits and/or components and/or to perform the operations described herein.

Example Systems

The architectures and/or systems generally comprise those that include a circuit or other device embodying one or more of the inventive concepts disclosed herein. Embodiments of the present invention may include one or more integrated circuit devices (e.g., general purpose microprocessors, system-on-chip [SOC] devices, application specific integrated circuits [ASICs], etc.) or other apparatuses that include the circuits and/or perform the operations described herein. Such integrated circuit devices may also include, for example, one or more of the wireless communication protocol components, and/or an antenna path switch circuit configured to enable antenna paths in response to the media access grant outputs. For example, an integrated circuit device may include an arbitration circuit and one of the protocol components, while a second integrated circuit device may include the other protocol component.

Figure 6A:
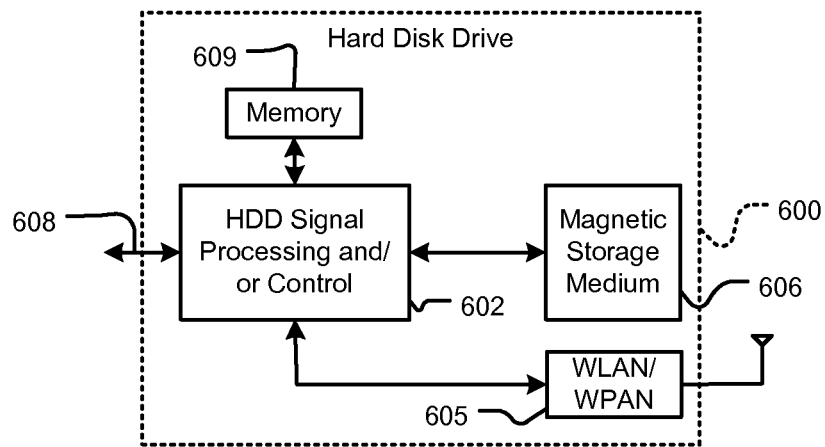
FIGS. 6A-6H are diagrams showing example systems in which the present invention may be used.

Various example implementations of the present invention are shown in FIGS. 6A-6H. Referring now to FIG. 6A, embodiments of the present invention can be implemented in a hard disk drive (HDD) 600. Embodiments of the present invention may implement either or both signal processing and/or control circuits, which are generally identified in FIG. 6A at 602. In some implementations, the signal processing and/or control circuit 602 and/or other circuits (not shown) in the HDD 600 may process data, perform coding and/or encryption, perform calculations, and/or format data that is output to and/or received from a magnetic storage medium 606. Embodiments of the present invention may also implement one or more wireless communication interfaces 605 for wireless local area networking (WLAN), wireless personal area networking (WPAN) and/or other wireless communication (e.g., between HDD 500 and one or more host and/or client devices).

The HDD 600 may communicate with a host device (not shown) such as a computer, mobile computing devices such as personal digital assistants, cellular phones, media or MP3 players and the like, and/or other devices via one or more wired communication links 608 and/or wireless communication links 605. The HDD 600 may be connected to memory 609 such as random access memory (RAM), nonvolatile memory such as flash memory, read only memory (ROM) and/or other suitable electronic data storage.

Figure 6B:
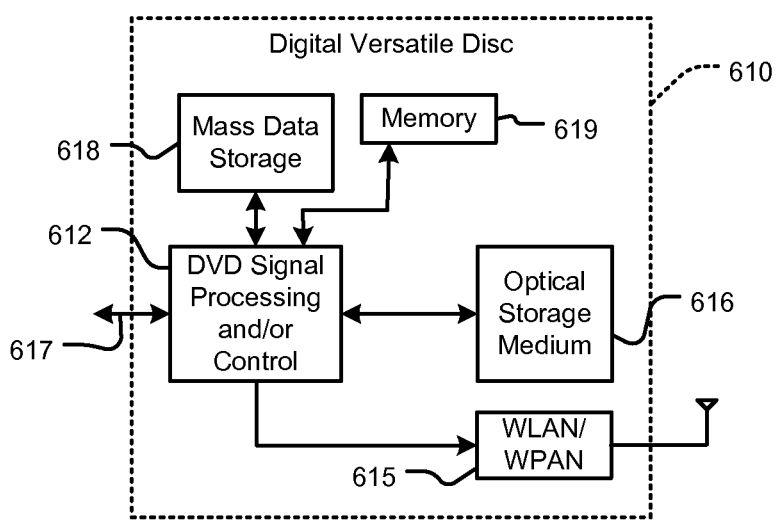

Referring now to FIG. 6B, embodiments of the present invention can be implemented in a digital versatile disc (DVD) drive 610. Embodiments of the present invention may implement either or both signal processing and/or control circuits, which are generally identified in FIG. 6B at 612, and/or mass data storage of the DVD drive 610. The signal processing and/or control circuit 612 and/or other circuits (not shown) in the DVD drive 610 may process data, perform coding and/or encryption, perform calculations, and/or format data that is read from and/or data written to an optical storage medium 616. In some implementations, the signal processing and/or control circuit 612 and/or other circuits (not shown) in the DVD drive 610 can also perform other functions such as encoding and/or decoding and/or any other signal processing functions associated with a DVD drive. Embodiments of the present invention may also implement one or more wireless communication interfaces 615 for wireless local area networking (WLAN), wireless personal area networking (WPAN) and/or other wireless communication.

The DVD drive 610 may communicate with an output device (not shown) such as a computer, television or other device via one or more wired or wireless communication links 617. The DVD drive 610 may communicate with mass data storage 618 that stores data in a nonvolatile manner. The mass data storage 618 may include a hard disk drive (HDD). The HDD may have the configuration shown in FIG. 6A. The HDD may be a mini HDD that includes one or more platters having a diameter that is smaller than approximately 1.8". The DVD drive 610 may be connected to memory 619 such as RAM, ROM, nonvolatile memory such as flash memory and/or other suitable electronic data storage.

Figure 6C:
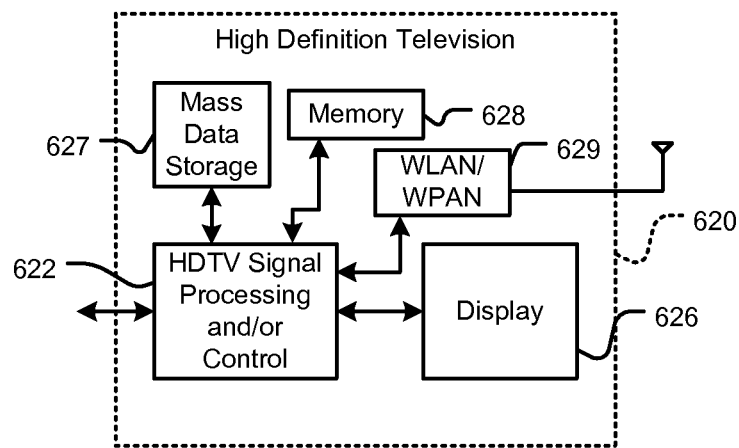

Referring now to FIG. 6C, embodiments of the present invention can be implemented in a high definition television (HDTV) 620. Embodiments of the present invention may implement either or both signal processing and/or control circuits, which are generally identified in FIG. 6E at 622, a WLAN interface and/or mass data storage of the HDTV 620. The HDTV 620 receives HDTV input signals in either a wired or wireless format and generates HDTV output signals for a display 626. In some implementations, signal processing circuit and/or control circuit 622 and/or other circuits (not shown) of the HDTV 620 may process data, perform coding and/or encryption, perform calculations, format data and/or perform any other type of HDTV processing that may be required.

The HDTV 620 may communicate with mass data storage 627 that stores data in a nonvolatile manner such as optical and/or magnetic storage devices (for example, hard disk drives [HDDs] and/or DVD drives). At least one HDD may have the configuration shown in FIG. 6A and/or at least one DVD drive may have the configuration shown in FIG. 6B. The HDD may be a mini HDD that includes one or more platters having a diameter that is smaller than approximately 1.8". The HDTV 620 may be connected to memory 628 such as RAM, ROM, nonvolatile memory such as flash memory and/or other suitable electronic data storage. Embodiments of the present invention may also implement one or more wireless communication interfaces 629 for wireless local area networking (WLAN), wireless personal area networking (WPAN) and/or other wireless communication.

Figure 6D:
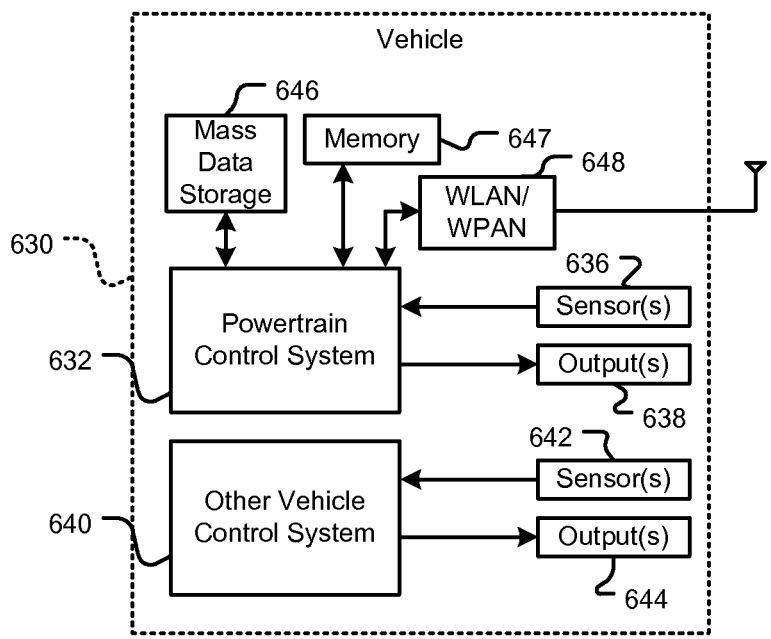

Referring now to FIG. 6D, embodiments of the present invention may implement a control system of a vehicle 630, a wireless interface 648 and/or mass data storage 646 of the vehicle control system. In some implementations, embodiments of the present invention implement a powertrain control system 632 that receives inputs from one or more sensors such as temperature sensors, pressure sensors, rotational sensors, airflow sensors and/or any other suitable sensors and/or that generates one or more output control signals such as engine operating parameters, transmission operating parameters, and/or other control signals. Embodiments of the present invention may also implement one or more wireless communication interfaces 648 for wireless local area networking (WLAN), wireless personal area networking (WPAN) and/or other wireless communication.

Embodiments of the present invention may also be implemented in other control systems 640 of the vehicle 630. The control system 640 may likewise receive signals from input sensors 642 and/or output control signals to one or more output devices 644. In some implementations, the control system 640 may be part of an anti-lock braking system (ABS), a navigation system, a telematics system, a vehicle telematics system, a lane departure system, an adaptive cruise control system, a vehicle entertainment system such as a stereo, DVD, compact disc and the like. Still other implementations are contemplated.

The powertrain control system 632 may communicate with mass data storage 646 that stores data in a nonvolatile manner. The mass data storage 646 may include optical and/or magnetic storage devices (for example, hard disk drives [HDDs] and/or DVD drives). At least one HDD may have the configuration shown in FIG. 6A and/or at least one DVD drive may have the configuration shown in FIG. 6B. The HDD may be a mini HDD that includes one or more platters having a diameter that is smaller than approximately 1.8". The powertrain control system 632 may be connected to memory 647 such as RAM, ROM, nonvolatile memory such as flash memory and/or other suitable electronic data storage. The powertrain control system 632 also may support connections with a WLAN via a WLAN network interface 648. The control system 640 may also include mass data storage, memory and/or one or more wireless interfaces (all not shown).

Figure 6E:
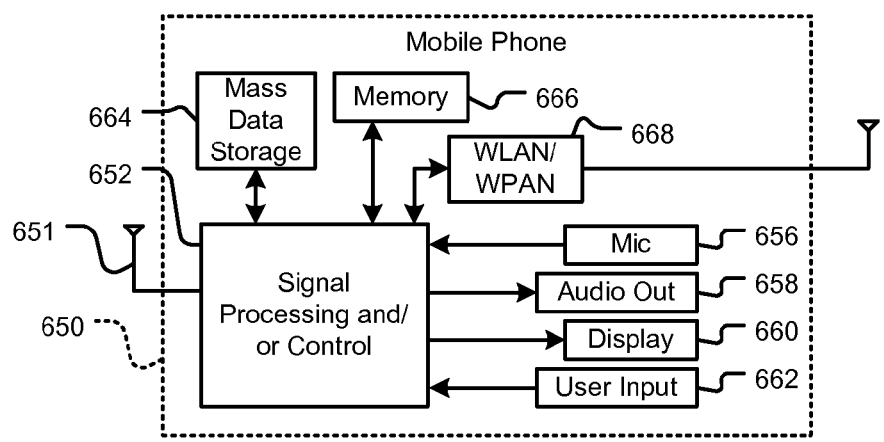

Referring now to FIG. 6E, embodiments of the present invention can be implemented in a cellular and/or mobile phone 650 that may include an antenna 651. Embodiments of the present invention may implement either or both signal processing and/or control circuits, which are generally identified in FIG. 6E at 652, a WLAN interface and/or mass data storage of the mobile phone 650. In some implementations, the phone 650 includes a microphone 656, an audio output 658 such as a speaker and/or audio output jack, a display 660 and/or an input device 662 such as a keypad, pointing device, voice actuation and/or other input device. The signal processing and/or control circuits 652 and/or other circuits (not shown) in the phone 650 may process data, perform coding and/or encryption, perform calculations, format data and/or perform other cellular phone functions.

The cellular phone 650 may communicate with mass data storage 664 that stores data in a nonvolatile manner such as optical and/or magnetic storage devices (for example, hard disk drives [HDDs] and/or DVDs). At least one HDD may have the configuration shown in FIG. 6A and/or at least one DVD may have the configuration shown in FIG. 6B. The HDD may be a mini HDD that includes one or more platters having a diameter that is smaller than approximately 1.8". The cellular phone 650 may be connected to memory 666 such as RAM, ROM, nonvolatile memory such as flash memory and/or other suitable electronic data storage. Embodiments of the present invention may also implement one or more wireless communication interfaces 668 for wireless local area networking (WLAN), wireless personal area networking (WPAN) and/or other wireless communication.

Figure 6F:
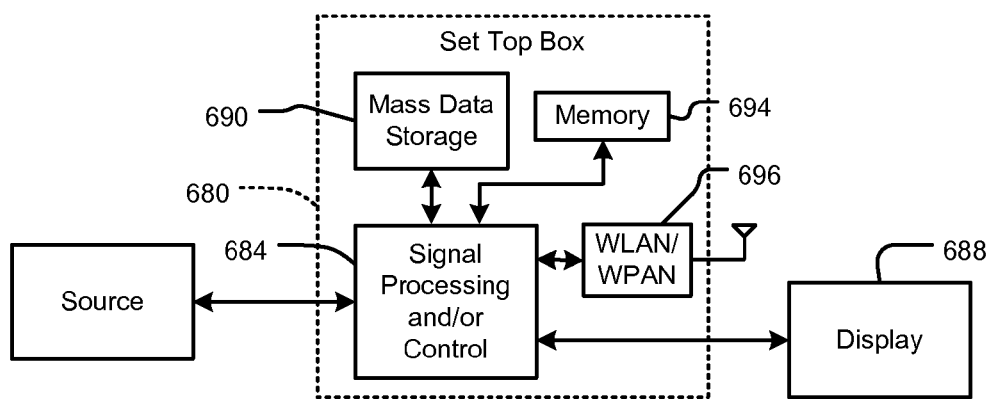
Figure 6G:
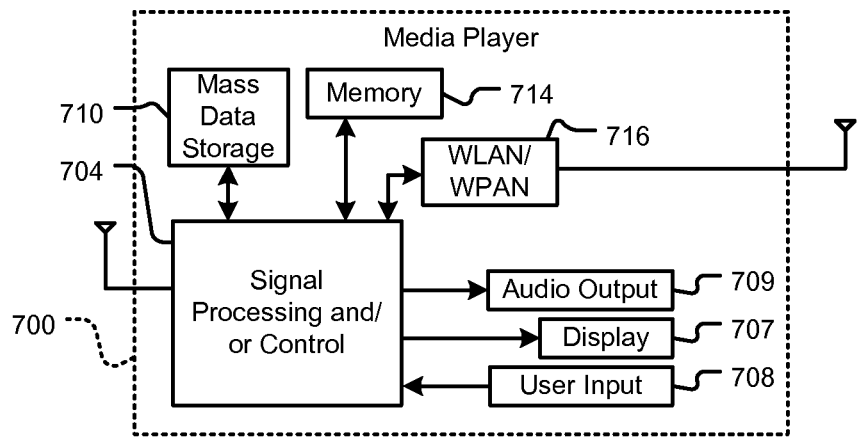

Referring now to FIG. 6F, embodiments of the present invention can be implemented in a set top box 680. Embodiments of the present invention may implement either or both signal processing and/or control circuits, which are generally identified in FIG. 6F at 684, a WLAN interface and/or mass data storage of the set top box 680. The set top box 680 receives signals from a source such as a broadband source and outputs standard and/or high definition audio/video signals suitable for a display 688 such as a television and/or monitor and/or other video and/or audio output devices. The signal processing and/or control circuits 684 and/or other circuits (not shown) of the set top box 680 may process data, perform coding and/or encryption, perform calculations, format data and/or perform any other set top box function.

The set top box 680 may communicate with mass data storage 690 that stores data in a nonvolatile manner. The mass data storage 690 may include optical and/or magnetic storage devices (for example, hard disk drives [HDDs] and/or DVD drives). At least one HDD may have the configuration shown in FIG. 6A and/or at least one DVD drive may have the configuration shown in FIG. 6B. The HDD may be a mini HDD that includes one or more platters having a diameter that is smaller than approximately 1.8". The set top box 680 may be connected to memory 694 such as RAM, ROM, nonvolatile memory such as flash memory and/or other suitable electronic data storage Embodiments of the present invention may also implement one or more wireless communication interfaces 696 for wireless local area networking (WLAN), wireless personal area networking (WPAN) and/or other wireless communication.

Referring now to FIG. 6F, embodiments of the present invention can be implemented in a media player 700. Embodiments of the present invention may implement either or both signal processing and/or control circuits, which are generally identified in FIG. 6G at 704, a wireless interface and/or mass data storage of the media player 700. In some implementations, the media player 700 includes a display 707 and/or a user input 708 such as a keypad, touchpad and the like. In some implementations, the media player 700 may employ a graphical user interface (GUI) that typically employs menus, drop down menus, icons and/or a point-and-click interface via the display 707 and/or user input 708. The media player 700 further includes an audio output 709 such as a speaker and/or audio output jack. The signal processing and/or control circuits 704 and/or other circuits (not shown) of the media player 700 may process data, perform coding and/or encryption, perform calculations, format data and/or perform any other media player function.

The media player 700 may communicate with mass data storage 710 that stores data such as compressed audio and/or video content in a nonvolatile manner. In some implementations, the compressed audio files include files that are compliant with MP3 format or other suitable compressed audio and/or video formats. The mass data storage may include optical and/or magnetic storage devices (for example, hard disk drives [HDDs] and/or DVD drives). At least one HDD may have the configuration shown in FIG. 6A and/or at least one DVD drive may have the configuration shown in FIG. 6B. The HDD may be a mini HDD that includes one or more platters having a diameter that is smaller than approximately 1.8". The media player 700 may be connected to memory 714 such as RAM, ROM, nonvolatile memory such as flash memory and/or other suitable electronic data storage. Embodiments of the present invention may also implement one or more wireless communication interfaces 716 for wireless local area networking (WLAN), wireless personal area networking (WPAN) and/or other wireless communication.

Figure 6H:
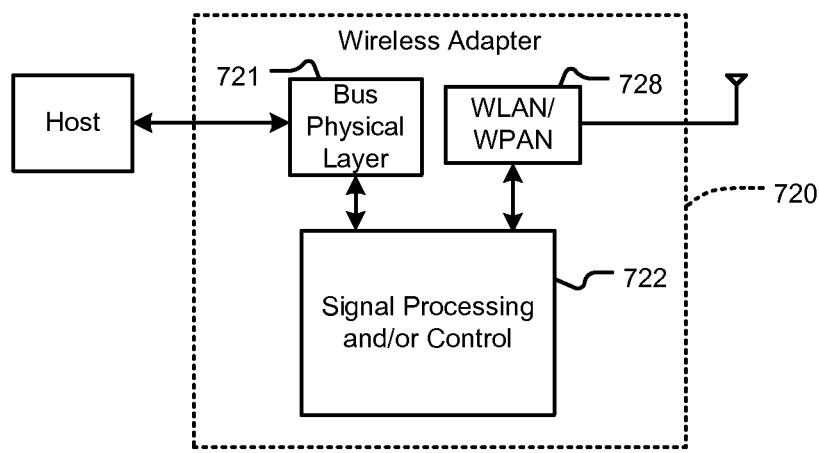

Referring now to FIG. 6H, embodiments of the present invention can be implemented in a wireless adapter 720. Embodiments of the present invention may implement either or both signal processing and/or control circuits 722, and/or one or more wireless communication interfaces 728 for wireless local area networking (WLAN), wireless personal area networking (WPAN) and/or other wireless communication. Wireless adapter 720 generally provides one or more wireless network interfaces to a host device over a data communication bus such as Universal Serial Bus (USB), Secure Digital Input Output (SDIO), etc. Still other implementations in addition to those described above are contemplated.

CONCLUSION/SUMMARY

Thus, embodiments of the present invention include circuits, architectures, systems, methods, algorithms, and software and/or firmware for selecting antenna paths between an antenna and multiple wireless communication protocol components. Embodiments of the present invention advantageously provide for a flexible interface for selecting the antenna signal paths.

The foregoing descriptions of specific embodiments of the present invention have been presented for purposes of illustration and description. They are not intended to be exhaustive or to limit the invention to the precise forms disclosed, and other modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. An apparatus for use in a system having i) a plurality of antenna paths configured to couple multiple protocol processing devices to an antenna, and ii) one or more switches to selectively enable antenna paths in the plurality of antenna paths, the apparatus comprising:
   an arbiter circuit configured to
      receive a plurality of media access request signals from the multiple protocol processing devices, wherein each protocol processing device is configured to operate in conformance with a respective communication protocol, and
      generate a plurality of media access grant indicators using i) the plurality of media access request signals, and ii) coexistence arbitration rules, wherein the plurality of media access grant indicators indicate, for each protocol processing device, whether the protocol processing device is authorized to access the antenna; and
   a selector circuit configured to
      receive the plurality of media access grant indicators from the arbiter circuit,
      when the plurality of media access grant indicators indicate more than one protocol processing device is authorized to access the antenna, determine a compatibility of the more than one protocol processing device simultaneously accessing the antenna, and
      generate a plurality of switch control signals based on i) the plurality of media access grant indicators, and ii) the determined compatibility of the more than one protocol processing device simultaneously accessing the antenna, the plurality of switch control signals for controlling the one or more switches to selectively enable antenna paths in the plurality of antenna paths, including selectively enabling a shared antenna path that permits shared access to the antenna by two or more of the protocol processing devices.

2. The apparatus of claim 1, wherein the plurality of media access grant indicators indicate at least:
   whether a first protocol processing device of the multiple protocol processing devices is authorized to transmit via the antenna,
   whether the first protocol processing device is authorized to receive via the antenna, and
   whether a second protocol processing device of the multiple protocol processing devices is authorized to access the antenna.

3. The apparatus of claim 2, wherein the plurality of media access grant indicators indicate at least whether the second protocol processing device is authorized for bi-directional access to the antenna.

4. The apparatus of claim 3, wherein the plurality of media access grant indicators indicate at least whether the second protocol processing device is authorized for transmit-only access to the antenna.

5. The apparatus of claim 3, wherein:
   the first protocol processing device comprises a wireless local area network (WLAN) device configured to process radio frequency (RF) input signals and RF output signals according to a WLAN protocol; and
   the second protocol processing device comprises a wireless personal area network (WPAN) device configured to process RF input signals and RF output signals according to a WPAN protocol.

6. The apparatus of claim 1, wherein the shared antenna path permits shared receive-only access to the antenna by two or more of the protocol processing devices.

7. The apparatus of claim 1, wherein the selector circuit is configured to determine the compatibility of the more than one protocol processing device simultaneously accessing the antenna based on a predetermined compatibility of media access grant indicators that indicate more than one protocol processing device is authorized to access the antenna.

8. The apparatus of claim 7, wherein the selector circuit is configured to determine the compatibility of the more than one protocol processing device simultaneously accessing the antenna at least in part by retrieving compatibility information from a memory.

9. The apparatus of claim 1, wherein the selector circuit is configured to generate the plurality of switch control signals for controlling the one or more switches to selectively enable:
   a first path to enable a first protocol processing device of the multiple protocol processing devices to transmit via the antenna; and
   a second path to jointly enable i) the first protocol processing device receive-only access to the antenna, and ii) a second protocol processing device of the multiple protocol processing devices receive access to the antenna.

10. The apparatus of claim 9, wherein the second path enables the second protocol processing device bi-directional access to the antenna.

11. The apparatus of claim 1, further comprising the multiple protocol processing devices.

12. The apparatus of claim 1, further comprising the one or more switches.

13. A method for use in a system having i) a plurality of antenna paths configured to couple multiple protocol processing devices to an antenna, and ii) one or more switches to selectively enable antenna paths in the plurality of antenna paths, the method comprising:
   receiving, at one or more integrated circuit (IC) devices, a plurality of media access request signals from the multiple protocol processing devices, wherein each protocol processing device is configured to operate in conformance with a respective communication protocol;
   generating, at one or more IC devices, a plurality of media access grant indicators using i) the plurality of media access request signals, and ii) coexistence arbitration rules, wherein the plurality of media access grant indicators indicate, for each protocol processing device, whether the protocol processing device is authorized to access the antenna;
   when the plurality of media access grant indicators indicate more than one protocol processing device is authorized to access the antenna, determining, at one or more IC devices, a compatibility of the more than one protocol processing device simultaneously accessing the antenna; and
   generating, at one or more IC devices, a plurality of switch control signals based on i) the plurality of media access grant indicators, and ii) the determined compatibility of the more than one protocol processing device simultaneously accessing the antenna, the plurality of switch control signals for controlling the one or more switches to selectively enable antenna paths in the plurality of antenna paths, including selectively enabling a shared antenna path that permits shared access to the antenna by two or more of the protocol processing devices.

14. The method of claim 13, wherein the plurality of media access grant indicators indicate at least:
   whether a first protocol processing device of the multiple protocol processing devices is authorized to transmit via the antenna,
   whether the first protocol processing device is authorized to receive via the antenna, and
   whether a second protocol processing device of the multiple protocol processing devices is authorized to access the antenna.

15. The method of claim 14, wherein the plurality of media access grant indicators indicate at least whether the second protocol processing device is authorized for bi-directional access to the antenna.

16. The method of claim 15, wherein the plurality of media access grant indicators indicate at least whether the second protocol processing device is authorized for transmit-only access to the antenna.

17. The method of claim 15, wherein:
   the first protocol processing device comprises a wireless local area network (WLAN) device configured to process radio frequency (RF) input signals and RF output signals according to a WLAN protocol; and
   the second protocol processing device comprises a wireless personal area network (WPAN) device configured to process RF input signals and RF output signals according to a WPAN protocol.

18. The method of claim 13, wherein the shared antenna path permits shared receive-only access to the antenna by two or more of the protocol processing devices.

19. The method of claim 13, wherein determining the compatibility of the more than one protocol processing device simultaneously accessing the antenna is based on a predetermined compatibility of media access grant indicators that indicate more than one protocol processing device is authorized to access the antenna.

20. The method of claim 19, wherein determining the compatibility of the more than one protocol processing device simultaneously accessing the antenna includes retrieving compatibility information from a memory.

21. The method of claim 13, wherein generating the plurality of switch control signals selectively enables at least:
   a first path to enable a first protocol processing device of the multiple protocol processing devices to transmit via the antenna; and
   a second path to jointly enable i) the first protocol processing device receive-only access to the antenna, and ii) a second protocol processing device of the multiple protocol processing devices receive access to the antenna.

22. The method of claim 21, wherein the second path enables the second protocol processing device bi-directional access to the antenna.

23. A tangible, non-transitory computer readable medium storing machine readable instructions that, when executed by a processor in a system having i) a plurality of antenna paths configured to couple multiple protocol processing devices to an antenna, and ii) one or more switches to selectively enable antenna paths in the plurality of antenna paths, cause the processor to:
   generate a plurality of media access grant indicators using i) a plurality of media access request signals corresponding to multiple protocol processing devices, and ii) coexistence arbitration rules, wherein
      each protocol processing device is configured to operate in conformance with a respective communication protocol, and
      the plurality of media access grant indicators indicate, for each protocol processing device, whether the protocol processing device is authorized to access the antenna;
   when the plurality of media access grant indicators indicate more than one protocol processing device is authorized to access the antenna, determine a compatibility of the more than one protocol processing device simultaneously accessing the antenna; and
   cause a plurality of switch control signals to be generated based on i) the plurality of media access grant indicators, and ii) the determined compatibility of the more than one protocol processing device simultaneously accessing the antenna, the plurality of switch control signals for controlling the one or more switches to selectively enable antenna paths in the plurality of antenna paths, including selectively enabling a shared antenna path that permits shared access to the antenna by two or more of the protocol processing devices.

24. The non-transitory computer readable medium of claim 23, wherein the plurality of media access grant indicators indicate at least:
   whether a first protocol processing device of the multiple protocol processing devices is authorized to transmit via the antenna,
   whether the first protocol processing device is authorized to receive via the antenna, and
   whether a second protocol processing device of the multiple protocol processing devices is authorized to access the antenna.

25. The non-transitory computer readable medium of claim 24, wherein the plurality of media access grant indicators indicate at least whether the second protocol processing device is authorized for bi-directional access to the antenna.

26. The non-transitory computer readable medium of claim 25, wherein the plurality of media access grant indicators indicate at least whether the second protocol processing device is authorized for transmit-only access to the antenna.

27. The non-transitory computer readable medium of claim 25, wherein:
   the first protocol processing device comprises a wireless local area network (WLAN) device configured to process radio frequency (RF) input signals and RF output signals according to a WLAN protocol; and
   the second protocol processing device comprises a wireless personal area network (WPAN) device configured to process RF input signals and RF output signals according to a WPAN protocol.

28. The non-transitory computer readable medium of claim 23, wherein the shared antenna path permits shared receive-only access to the antenna by two or more of the protocol processing devices.

29. The tangible, non-transitory computer readable medium of claim 23, further storing machine readable instructions that, when executed by the processor, cause the processor to:
   determine the compatibility of the more than one protocol processing device simultaneously accessing the antenna based on a predetermined compatibility of media access grant indicators that indicate more than one protocol processing device is authorized to access the antenna.

30. The tangible, non-transitory computer readable medium of claim 29, further storing machine readable instructions that, when executed by the processor, cause the processor to, determine the compatibility of the more than one protocol processing device simultaneously accessing the antenna by retrieving compatibility information from a memory coupled to the processor.

31. The tangible, non-transitory computer readable medium of claim 23, storing machine readable instructions that, when executed by the processor, cause the processor to cause the plurality of switch control signals to be generated to selectively enable at least:
- a first path to enable a first protocol processing device of the multiple protocol processing devices to transmit via the antenna; and
- a second path to jointly enable i) the first protocol processing device receive-only access to the antenna, and ii) a second protocol processing device of the multiple protocol processing devices receive access to the antenna.

32. The tangible, non-transitory computer readable medium of claim 31, wherein the second path enables the second protocol processing device bi-directional access to the antenna.

* * * * *